C. H. GAYLORD & E. M. AYERS.
Stalk-Cutter.

No. 166,200. Patented Aug. 3, 1875.

UNITED STATES PATENT OFFICE

CHARLES H. GAYLORD AND EDWARD M. AYERS, OF OSCEOLA, ARKANSAS.

IMPROVEMENT IN STALK-CUTTERS.

Specification forming part of Letters Patent No. 166,200, dated August 3, 1875; application filed May 8, 1875.

*To all whom it may concern:*

Be it known that we, CHARLES H. GAYLORD and EDWARD M. AYERS, of Osceola, in the county of Mississippi and State of Arkansas, have invented certain new and useful Improvements in Cotton, Corn, and other Stalk Cutters; and we do hereby declare the following to be a full, clear, and exact description of the invention, such as will enable others skilled in the art to which it pertains to make and use it, reference being had to the accompanying drawings, which form part of this specification.

Our invention relates to that class of cotton or corn stalk cutters in which the cutting-blade is attached in a somewhat similar manner as the mold-board to the beam of a common plow, and intended to be operated by horse-power, the same as the ordinary plow, only being drawn over the ground, and operating to cut the stalks as they stand in the field just beneath or at the surface of the ground.

Figure 1:
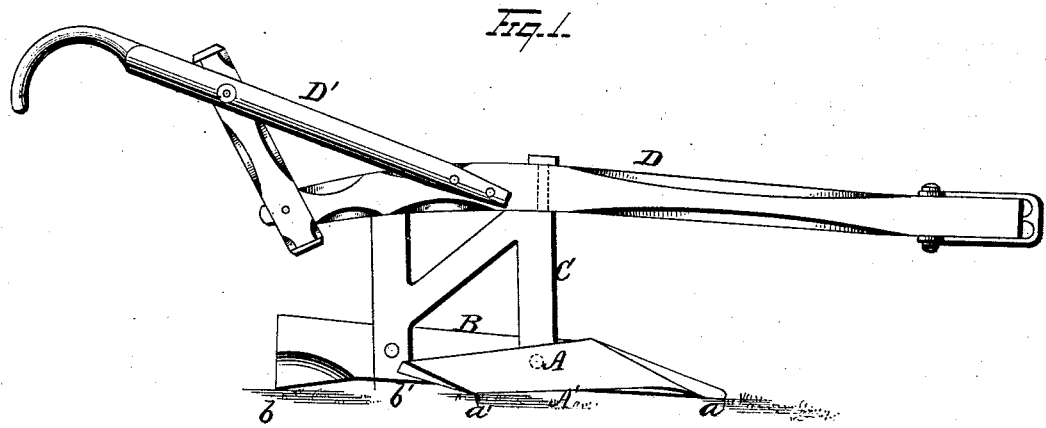
Figure 2:
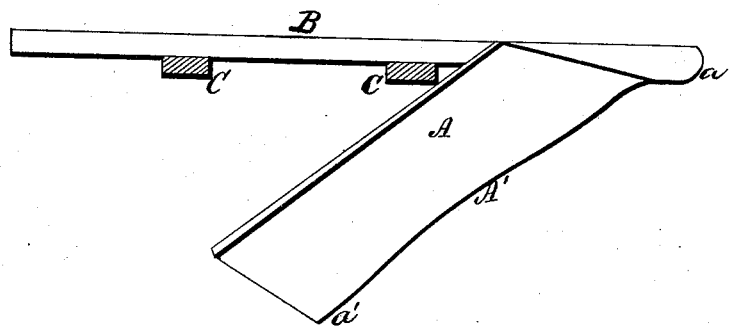

In the drawings, Figure 1 represents a side elevation of our invention; and Fig. 2, a plan view of the cutting portion, with the beam and handles removed.

A is the cutting-blade, made to ride just under the surface of the ground, resting on the points $a$ $a'$, which project below the other cutting-edge, A', and made to extend sidewise on a horizontal plane to any sufficient distance. This blade is attached at the front portion to a bar or land-side, B, which extends some distance rearward. The rear lower end $b$ of this bar B is made sharp, and projects a little below the straight edge $b'$. C is the standard by which the parts A B are attached to an ordinary plow-beam, D, provided with handles D'.

The operation of our invention is as follows: As the instrument is drawn over the ground the sharp point $b$ penetrates into the ground and holds the device in place. The sharp cutting-edge of the blade A coming against the stalks as they stand, they are cut off by a drawing cut close to the surface under the ground, as is apparent.

Having thus described our invention, what we claim as new, and desire to secure by Letters Patent, is—

The stalk-cutter composed of cutting-blade A, placed and secured in a nearly flat or slightly-inclined position, constructed or formed with curved sharp cutting-edge A' and projecting points $a$ $a'$, upon which it rests, land-side B, formed with a rear projecting sharp point, $b$, standard C, and ordinary plow-beam and handles D D', as and for the purposes described.

In testimony that we claim the foregoing we have hereunto set our hands this 1st day of May, 1875.

CHARLES H. GAYLORD.
        EDWARD M. AYERS.

Witnesses:
    J. W. CLAPP, Jr.,
    L. ROUSSAU.